US012260843B2

(12) United States Patent
Yoshimoto

(10) Patent No.: US 12,260,843 B2
(45) Date of Patent: Mar. 25, 2025

(54) PERCUSSION SOUND ATTENUATION SYSTEM

(71) Applicant: Max Yoshimoto, Sunnyvale, CA (US)

(72) Inventor: Max Yoshimoto, Sunnyvale, CA (US)

( * ) Notice: Subject to any disclaimer, the term of this patent is extended or adjusted under 35 U.S.C. 154(b) by 187 days.

(21) Appl. No.: 18/083,170

(22) Filed: Dec. 16, 2022

(65) Prior Publication Data

US 2024/0203382 A1 Jun. 20, 2024

(51) Int. Cl.
*G10D 13/00* (2020.01)
*G10D 13/06* (2020.01)
*G10D 13/10* (2020.01)

(52) U.S. Cl.
CPC ............. *G10D 13/25* (2020.02); *G10D 13/06* (2013.01)

(58) Field of Classification Search
CPC ........ G10D 13/25; G10D 13/06; G10D 13/02; G10D 13/14
See application file for complete search history.

(56) References Cited

U.S. PATENT DOCUMENTS

| | | | |
|---|---|---|---|
| 2,574,591 A | 11/1951 | Rudd | |
| 5,569,864 A | 10/1996 | Hamanga et al. | |
| 6,659,223 B2 | 12/2003 | Allison et al. | |
| 9,640,152 B2 | 5/2017 | Allendorph | |
| 9,670,665 B2 | 6/2017 | Kipp et al. | |
| 2002/0096035 A1* | 7/2002 | Good | G10D 13/14 84/414 |
| 2017/0028687 A1* | 2/2017 | DeRosa | B32B 17/10036 |

FOREIGN PATENT DOCUMENTS

| | | | | |
|---|---|---|---|---|
| CN | 1157997 C | * | 7/2004 | H04R 1/22 |
| CN | 203726926 U | * | 7/2014 | A63B 51/02 |
| CN | 110997994 A | * | 4/2020 | A63B 51/02 |
| JP | H0610994 U | * | 2/1994 | H04R 1/22 |

* cited by examiner

*Primary Examiner* — Kimberly R Lockett
(74) *Attorney, Agent, or Firm* — Robert Brownstein

(57) ABSTRACT

The invention is a sound-attenuating system operative to attach to a surface of a metallic percussion instrument, and attenuate sound produced by striking the sound-attenuating system with a drum stick.

17 Claims, 4 Drawing Sheets

PERCUSSION SOUND ATTENUATION SYSTEM

TECHNICAL FIELD

The invention is a system used to attenuate the sound of a metallic percussion instrument.

BACKGROUND OF INVENTION

Modern musical drum kits comprise, typically, a bass, snare, tom-tom drums and metallic cymbals. Drum kits, typically for Latin music groups, may include metal-sided drums, such as timbales.

Bass, snare and tom-tom drums typically comprise a cylindrical metallic structure with circular materials, called "skins," mounted at each end of the cylinder. The circumference and axial length of the cylindrical portion determines the pitch range of the sound produced by striking a stretched skin surface with a drum stick. In addition to these drum-kit items, there are usually metallic cymbals, called "high-hat," "crash," and "ride" cymbals that are mounted so as to allow them to vibrate when struck by a drum stick. Many drum-kits also feature a metallic bell-like structure called a "cowbell." Latin bands may have metallic-sided drums such as timbales Drums are percussion instruments whose volume is determined by the force and speed with which a drum stick strikes a surface. Drummers typically practice during daytime, or in acoustically conditioned rooms, because of the loudness of these instruments to avoid complaints. As a result, muting (sound attenuating) accessories have been invented and offered for sale that essentially sit on the surface of a skin and reduce the loudness of sound resulting from a drum-stick strike. These are typically circular materials that are held in place by the rim on top of a drum's cylindrical structure. Similarly, circular sound-attenuating devices have been invented and offered for sale that sit atop a cymbal and reduce the volume produced by a drum-stick strike. These devices are circular and have hole in the center that affixes to the rod that passes through a cymbal's mounting hole.

Cowbells have a very different structure than a drum or a cymbal. They are three-dimensional metallic structures, hollowed inside and opened on one end. The end opposite the open end is used to mount the cowbell such that the planes of the closed and opened ends are both essentially perpendicular to a floor. When struck on the side, with a drum stick, a cowbell makes a distinctive bell-like sound. However, the sound-attenuation devices currently available for drums and cymbals will not work with a cowbell. Thus, drummers practicing with muted drum kits either avoid hitting a cowbell, or have to suppress the force with which they strike it. That can be disconcerting because under non-muted conditions, the drummer would not do so.

Drum sound attenuation, for drum kits that comprise a cowbell, is therefore incomplete. A sound attenuation device that could be mounted to a cowbell and a timbale to attenuate their loudness would complete muted drum kits.

BRIEF DESCRIPTION OF INVENTION

The invention is essentially a flexible section of sound-attenuation material that is sized so as to fit the top cowbell surface, or the surface of any other metallic drum, such as a timbale. In addition, since virtually all cowbells and timbales are made of metallic material, the invention features structures operative to hold it in place, once mounted, despite repeated drum-stick strikes. Moreover, when a muting device is removed, there should be no remaining structure, such as adherence portions, that may alter the sound of the unmuted drum.

DETAILED DESCRIPTION OF INVENTION

There are currently sound-attenuation accessories available for drums (bass, snare and tom-toms) as well as cymbals (high-hat, crash and ride). However, these devices are not usable with a drum kit's cowbell.

The invention herein disclosed and claimed is a system intended for attenuating the sound of a cowbell or metal-sided drums, such as a timbale.

Figure 1:
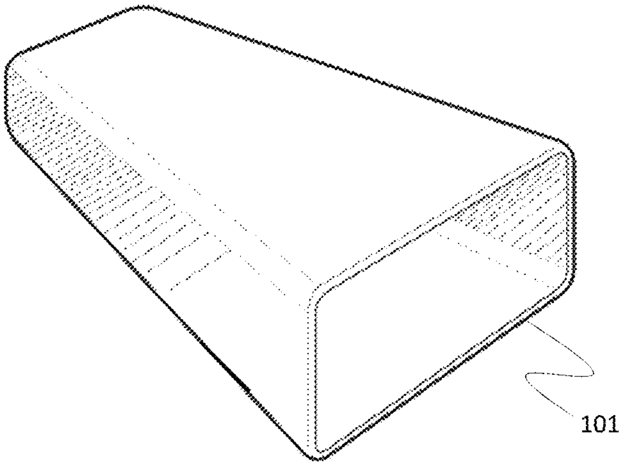
FIG. 1 shows a popular cowbell used in a drum kit

As shown in FIG. 1, 101, a cowbell is a metallic device, hollow inside, and open on one end. When struck with a drum stick, it will begin vibrating creating a distinctive, bell-like sound.

Figure 2:
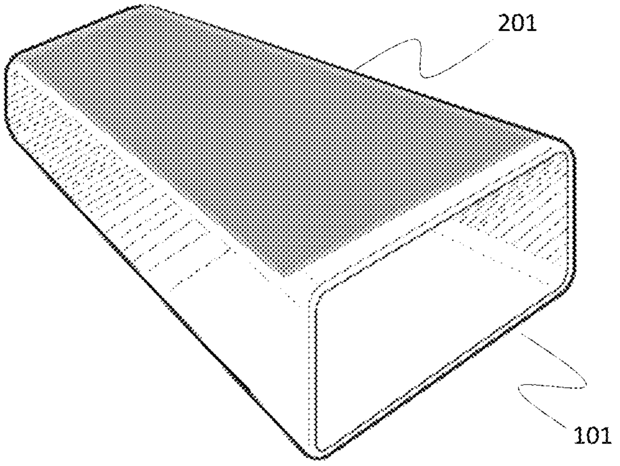
FIG. 2 shows the cowbell of FIG. 1 with a sound-attenuation system mounted to its top surface.

FIG. 2 shows the cowbell from FIG. 1 (101) with a sound-attenuation system (201) affixed to its top side, as oriented in the drawing.

Figure 3:
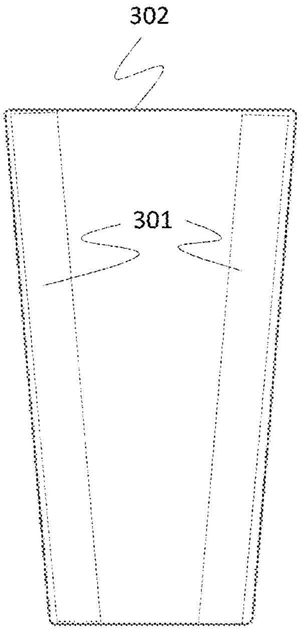
FIG. 3 shows a top view of the sound-attenuation system.

FIG. 3 is a top view of the sound-attenuating system showing the flexible sound-attenuation material portion (302) and two adherence strips (301 that underlie it, and their orientation.

Figure 4:
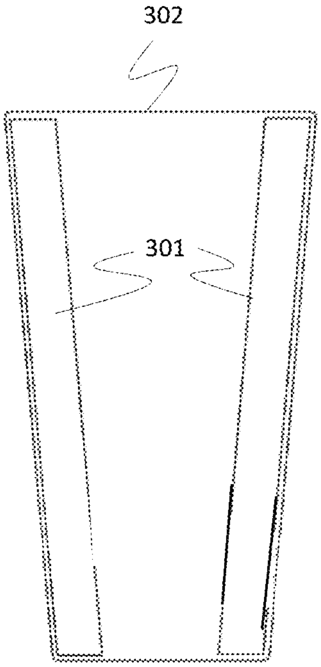
FIG. 4 shows a bottom view of the sound-attenuation system.

FIG. 4 shows a bottom view of the sound-attenuating system (201), showing the sound-attenuation portion (302) and the two adherence strips (301).

In one embodiment of the invention, the adherence strips (301) are attached to the sound-attenuation system's flexible-material portion (302) and are permanently magnetic metal strips. When the attenuation-system is placed atop the cowbell, if the cowbell is made of ferromagnetic metal, the magnetic strips (301) will adhere to the cowbell's surface and keep the system in place despite repeated drum-stick strikes.

Where a cowbell is not ferromagnetic, and a magnetized metallic strip will not adhere, a second embodiment of the invention uses one or more low-profile suctions cups, mounted on adherence strips, or a suction-cup tape, rather than metallic-strip magnetics, to achieve adherence to a non-ferromagnetic cowbell, cymbal or other percussive instruments with non-metallic surfaces. The second embodiment could also be used with a ferromagnetic cowbell and other metallic surfaces.

Figure 5:
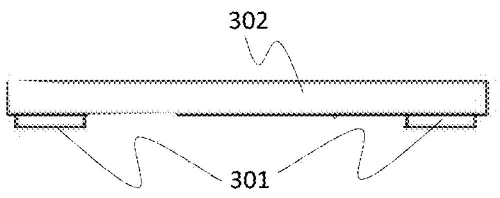
FIG. 5 shows an end view of the sound-attenuation system

FIG. 5 shows an end view of the sound-attenuation system showing the edge of the sound-attenuation material (302) and the edge of the adherence strips (301).

Figure 6:
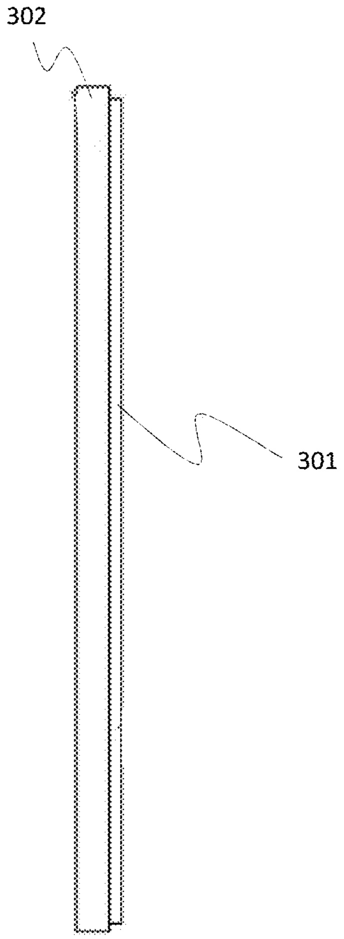
FIG. 6 shows a side view of the sound-attenuation system.

FIG. 6 shows a side view of the sound-attenuation system showing an edge of the sound-attenuation material (302) and an edge of the adherence strip.

Figure 7:
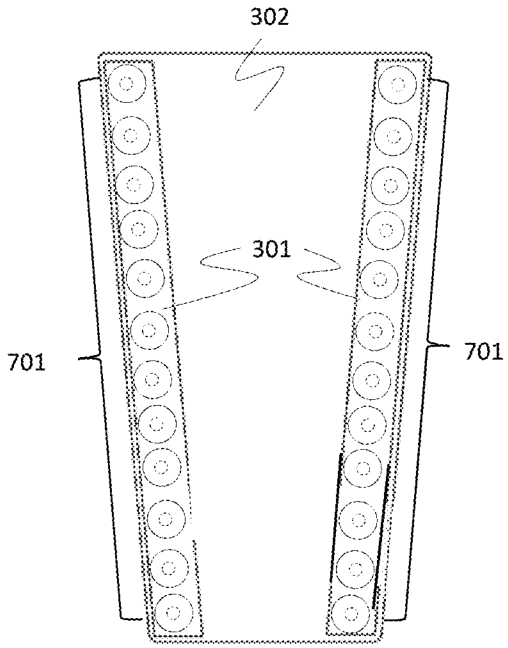
FIG. 7 shows a bottom view of a second embodiment of the sound-attenuation system.

FIG. 7 shows the second embodiment wherein the adherence strips comprise one or more low-profile suctions cups, or suction cup tape, (701) enabling adherence to a surface that is not ferromagnetic.

The sound-attenuation material can be made of a variety of materials, such as foam, rubber, mesh fabric, woven fabric, or the like.

The adherence strips, if permanently magnetized, would be made of ferromagnetic material which can be magnetized and will preserve its magnetic force long term.

The adherence strips, if used with suction cups for cowbells that are not ferromagnetic, can be made of any material that is sufficiently flexible and durable.

The shape and dimensions of sound-attenuation material and adherence strips is fully dependent upon the shape and dimensions of each cowbell.

The drawings and figures are meant to be illustrative and should not be seen as limiting the scope of the invention.

What is claimed is:

1. A sound-attenuation system comprising:
a sheet of sound-attenuation material;
at least one adherence strip operative to attach a portion of said sheet of sound-attenuation material to a portion of a surface of a metallic percussion instrument;
the at least one adherence strip is permanently magnetized metal and uses magnetic force to adhere to a surface of the metallic percussion instrument wherein the metallic percussion instrument is ferromagnetic.

2. A sound-attenuation system comprising:
the sheet of sound-attenuation material;
the at least one adherence strip operative to attach a portion of the sheet of sound-attenuation material to a portion of a surface of a metallic percussion instrument;
the at least one adherence strip comprises having one or more suction cups;
the suction cups are oriented such that each of the suction cups points away from a rigid strip and is operative to adhere to the surface of the metallic percussion instrument.

3. A sound-attenuation system as in claim 1 wherein:
the sound-attenuation material is made of a flexible, foam material.

4. A sound-attenuation system as in claim 1 wherein:
the sound-attenuation material is made of a rubber material.

5. A sound-attenuation system as in claim 1 wherein:
the sound-attenuation material is made of a synthetic rubber material.

6. A sound-attenuation system as in claim 1 wherein:
the sound-attenuation material is made of non-rigid polymer material.

7. A sound-attenuation system as in claim 1 wherein:
the sound-attenuation material is made of flexible, petroleum-derived material.

8. A sound-attenuation system as in claim 1 wherein:
the sound-attenuation material is made of flexible, woven material comprising natural fibers.

9. A sound-attenuation system as in claim 1 wherein:
the sound-attenuation material is made of flexible, woven material comprising synthetic fibers.

10. A sound-attenuation system as in claim 1 wherein:
the sound attenuation material is made of flexible woven, material comprising both natural and synthetic fibers.

11. A sound-attenuation system as in claim 2 wherein:
the sound-attenuation material is made of a flexible, foam material.

12. A sound-attenuation system as in claim 2 wherein:
the sound-attenuation material is made of a rubber material.

13. A sound-attenuation system as in claim 2 wherein:
the sound-attenuation material is made of a rubber material.

14. A sound-attenuation system as in claim 2 wherein:
the sound-attenuation material is made of non-rigid polymer material.

15. A sound-attenuation system as in claim 2 wherein:
the sound-attenuation material is made of flexible, petroleum-derived material.

16. A sound-attenuation system as in claim 2 wherein:
the sound-attenuation material is made of flexible, woven material comprising natural fibers.

17. A sound-attenuation system as in claim 2 wherein:
the sound attenuation material is made of flexible woven, material comprising both natural and synthetic fibers.

* * * * *